Sept. 8, 1942.     R. A. GEISELMAN     2,295,397
REGULATOR
Filed April 5, 1941    2 Sheets—Sheet 2

WITNESSES:

INVENTOR
Ralph A. Geiselman.
BY
James N. Ely
ATTORNEY

Patented Sept. 8, 1942

2,295,397

UNITED STATES PATENT OFFICE 2,295,397

REGULATOR

Ralph A. Geiselman, Wilkinsburg, Pa., assignor to Westinghouse Electric & Manufacturing Company, East Pittsburgh, Pa., a corporation of Pennsylvania Application April 5, 1941, Serial No. 387,044

5 Claims. (Cl. 172—293)

This invention relates to regulators, and particularly to regulators and regulating systems employed in controlling the speed of dynamo electric machines.

An object of this invention is to utilize an electromagnetic device movable in response to change in speed of a dynamo-electric machine for initiating the control of the excitation of the machine and to provide for a damping operation to prevent excessive changes in the excitation.

Figure 1:
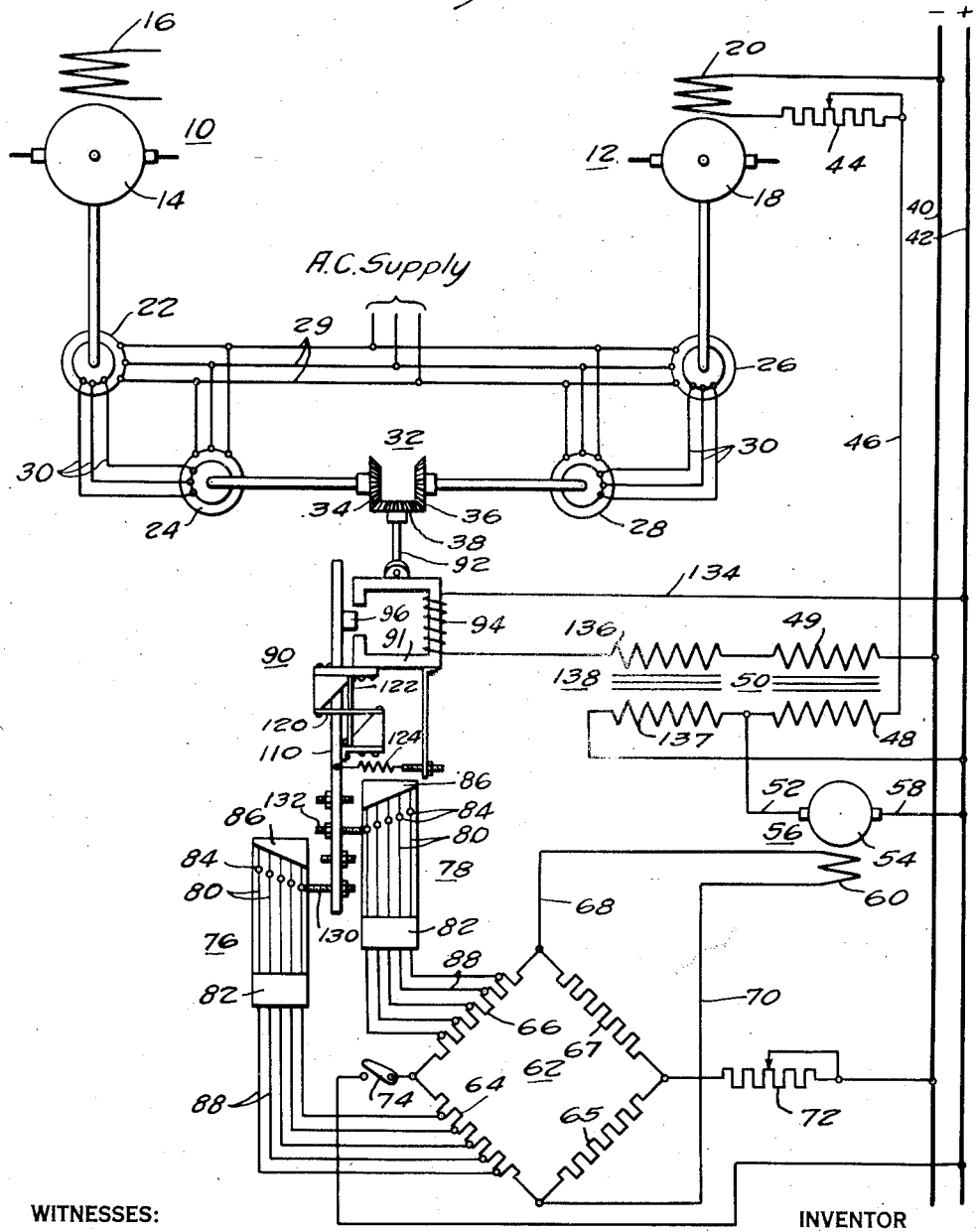
Figure 2:
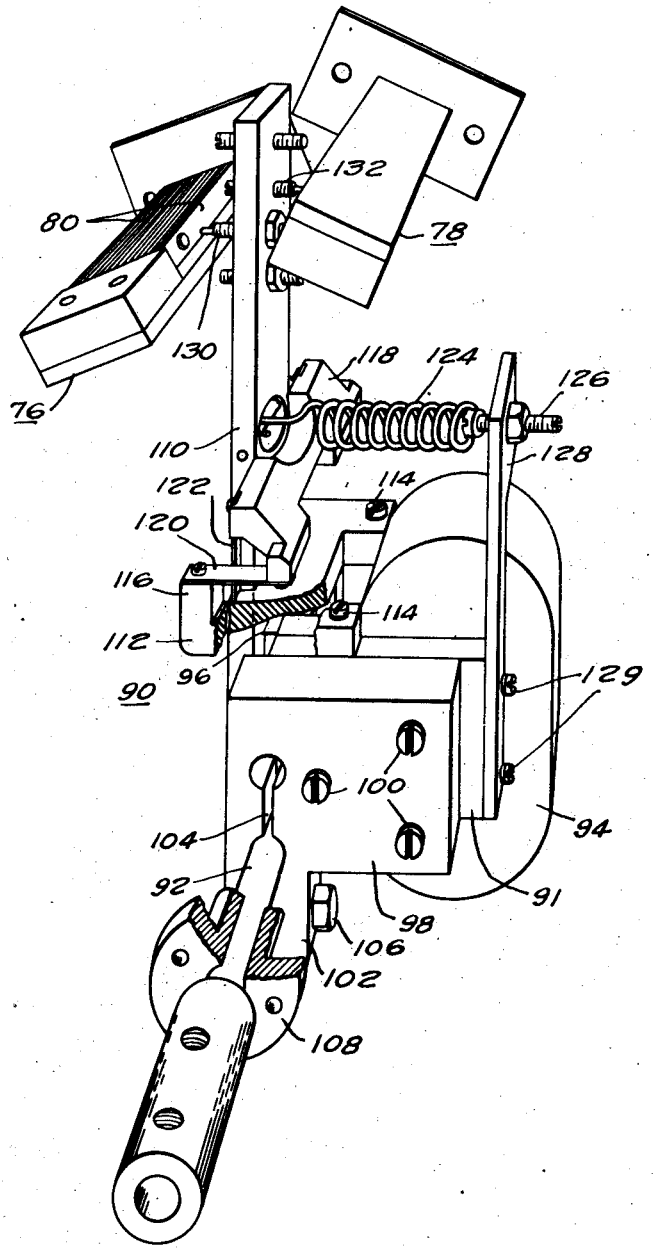

Other objects of this invention will become apparent from the following description when taken in conjunction with the accompanying drawings, in which:

Figure 1 is a diagrammatic illustration of circuits and apparatus embodying this invention, and Fig. 2 is a perspective view with parts broken away of the electromagnetic device utilized in a diagrammatic illustration of Fig. 1.

Referring to Fig. 1, there is illustrated a constant speed reference machine, such as the motor 10, and a dynamo-electric machine such as the motor 12, the speed of which it is desired to regulate. The motors 10 and 12 comprise an armature winding 14 and a field winding 16, and an armature winding 18 and field winding 20, respectively, the armature winding of the respective motors being connected to any suitable source of power (not shown). The field winding 16 of the constant speed motor 10 is also connected to a constant source of power (not shown).

The motors 10 and 12 are connected through a synchronous drive in a well-known manner, a synchronous transmitter 22 and a synchronous receiver 24 being associated with the motor 10, and a synchronous transmitter 26 and a synchronous receiver 28 being associated with the motor 12. The synchronous transmitters and synchronous receivers associated with the motors 10 and 12 are duplicate wound rotor induction motors having their primaries connected through conductors 29 to a constant three-phase alternating current supply source (not shown), with the rotors of the associated transmitters and receivers being electrically connected together by conductors 30. The transmitters and associated receivers function in the well-known manner, so that when properly connected or phased out, the machines remain stationary and there is no current flow in the rotor circuits. However, when the transmitter is turned, the small phase displacement between it and the receiver causes a current to flow between the machines developing a torque or turning moment. As illustrated, the rotors of the transmitters 22 and 26 are mechanically connected to and disposed to be driven by the motors 10 and 12, respectively.

The rotor of the receiver 24 is connected to drive one side of a mechanical differential connection 32, the rotor of the receiver 28 being mechanically connected to drive the other side of the differential connection. The differential connection comprises end or sun gear wheels 34 and 36 which are, respectively, driven by the receivers 24 and 28 and a middle or planetary gear wheel 38 which is responsive to the differential speeds of the end gear wheels.

The field winding 20 of the dynamo-electric machine 12 is connected to be energized from a constant source of direct current power, represented by the conductors 40 and 42. As illustrated, one end of the field winding 20 is connected directly to the conductor 40, the other end of the field winding 20 being connected through a variable resistor 44, conductor 46, the primary winding 48 of a current transformer 50, conductor 52, the armature winding 54 of an exciter generator 56 and conductor 58 to the line conductor 42. The exciter generator 56 has a field winding 60 and is of the buck-boost type for controlling the excitation of the field winding 20.

A Wheatstone bridge resistor 62 having two variable resistor legs 64 and 66 and two constant resistor legs 65 and 67 is connected in circuit relation with the field winding 60 of the generator 56 by conductors 68 and 70 extending from two of the terminals of the resistor bridge. The terminal of the bridge 62 between the legs 65 and 67 is connected to line conductor 40 through a variable resistor 72, and the terminal between the variable resistor legs 64 and 66 is connected to the line conductor 42 through a manual operable switch 74.

Primary control devices 76 and 78 are associated and electrically connected to the terminals or taps of the variable resistor legs 64 and 66, respectively, of the bridge 62 for controlling the shunting of the sections of the resistor in each leg, thereby controlling the direction of flow of current in the field winding 60 of generator 56, and also controlling the degree of excitation of the field winding 60. Each of the primary devices 76 and 78 comprises a plurality of elongated, self-biased conducting leaf springs 80 having one end secured in fixed relation and insulated from each other by a suitable insulating holding mechanism 82, the other ends of the spring leaves 80 carrying contact members 84 and being disposed to be actuated in sequence away from a sloped stop 86 to progressively contact the contact members. The fixed ends of the spring leaves 80 are connected by conductors 88 to terminals on the variable resistor 64 or 66 associated with the primary control device 76 or 78, respectively. Further description of the primary control devices 76 and 78 is believed to be unnecessary in describing this invention, but may be had by reference to the copending application Serial No. 203,876 of C. R. Hanna et al., now Patent 2,246,301, June 17, 1941, and assigned to the assignee of this invention.

An electromagnetic device 90 is provided as the primary actuating means for actuating the conducting members 80 of the primary control devices 76 and 78 to control the excitation of the generator 56 in accordance with predetermined conditions. The electromagnetic device 90 is mechanically carried by means of a shaft 92 on the planetary gear wheel 38 of the differential device 32 and is disposed for movement as the planetary gear wheel 38 moves in response to the differential speeds of the end gear wheels 34 and 36 of the differential connection 32.

Referring to Fig. 2 of the drawings, there is illustrated the electromagnetic device 90 comprising the actuating means for the contact members of the primary control devices 76 and 78 in accordance with this invention. As illustrated, the electromagnetic device 90 comprises a substantially U-shaped core member 91, an energizing winding 94 carried on the core member 91, and an armature 96 disposed to be actuated in accordance with the energization of the winding 94. A side plate 98 of non-magnetic material is mounted on the core member 91 as by means of screws 100 and is provided with a depending portion 102 having a slot 104 therein for receiving the end of the shaft 92 driven by the planetary gear wheel 38 of the differential device 32. The shaft 92 is mechanically retained in the slot 104 by means of tightening the screw 106, the edges of the slot thereby gripping the end of shaft 92. As illustrated, the shaft 92 projects through a supporting bearing 108 which is carried in a panel (not shown).

The armature 96 is carried on a lever arm 110 and disposed to be integrally mounted on the core member 91 of the electromagnetic device 90. As illustrated, a substantially U-shaped bracket member 112 of non-magnetic material is mounted on the top edge of the core member 91 as by means of non-magnetic screws 114, the U-shaped bracket member having upwardly turned ends 116 for facilitating the mounting of the lever 110. The lever 110 also carries the bracket member 118 which extends beyond the sides of the lever 110. As illustrated, a pivot for the lever 110 and the armature 96 carried thereby is provided by a plurality of horizontal spring leaf members 120 secured to and extending between the ends of the upwardly projecting portion 116 of the U-shaped bracket 112 and the ends of the bracket 118 on each side of the lever member 110. A plurality of vertical spring leaf members 122 disposed on each side of the lever member 110 is secured to and extends between the edges of the bracket 118 and the bracket 112. The combination of the vertical and horizontal spring members 122 and 120 gives a substantially floating pivotal mounting for the lever 110, the spring members, however, being so constructed that they are relatively weak for permitting slight movements of the armature 96, and consequently the lever 110, but are relatively stiff for resisting and preventing large movements of the lever 110 and armature 96 carried thereby. As in standard practice, a spring member 124 is connected between the lever 110 and an adjustable screw 126 which is carried in a bracket 128 of non-magnetic material secured to the core member 91 by non-magnetic screws 129 for balancing the pull on the armature 96. The lever 110 also carries driving members 130 and 132 of non-conducting material disposed for actuating the spring leaf members 80 of primary control devices 76 and 78, respectively. The primary control devices are mounted on a suitable panel (not shown) in position whereby a movement of the lever arm 110 actuates the driving members 130 or 132 to engage the conducting members of one or the other of the primary control devices depending upon the direction of movement of the lever.

Referring to Fig. 1, the electromagnetic device 90 carried by the shaft 92 has its energizing winding 94 connected to the constant source of direct current represented by the conductors 40 and 42, one end of the energizing winding being connected by conductor 134 to line conductor 42, the other end of the winding 94 being connected through the secondary winding 136 of a potential transformer 138 and the secondary winding 49 of the current transformer 50 to the line conductor 40. The primary winding 137 of the potential transformer 138 is connected across the armature 54 of the generator 56, the purpose of which will be explained more fully hereinafter.

In operation, assuming that the switch 74 is manually operated to close the circuit from the conductors 40 and 42 through the energizing winding 60 of the exciter generator 56, and assuming that the motor 12 is operating at the desired speed with respect to the constant speed reference machine 10, then no movement of the electromagnetic device 90 is obtained to actuate the conducting members 80 of the primary control device 76 or 78 and since the bridge 62 is balanced, current will not flow in the winding 60 of the generator 56. The field winding 20 of the motor 12 is consequently energized directly from the constant source of direct-current represented by the conductors 40 and 42.

If for any reason the speed of the motor 12 increases with respect to the speed of the constant speed reference machine 10, the transmitter 26 is operated to effect a phase displacement between the transmitter 26 and the receiver 28. Consequently, a torque or turning moment is developed for actuating the differential device 32 to effect a movement of the planetary gear wheel 38 of the differential device.

Assuming that the torque effects a movement of the shaft 92 to drive the electromagnetic device 90 toward the left, as viewed in Fig. 1, the driving member 130 carried by the lever 110 engages the conducting members 80 and progressively and in sequence forces them away from the sloped stop 86 to shunt successive sections of the variable resistor 64.

The shunting of the sections of resistor 64 causes a current to flow in the circuit which may be traced from line conductor 42, through the switch 74, the first conductor 88, the closed contact members 84 of the primary control device 76, the last conductor 88 of the closed conductor springs 80, the sections of the leg 64 of the bridge 62 which are not shunted, conductor 70, winding 60 of the generator 56, conductor 68, leg 67 of the bridge 62 and the variable resistor 72 to the line conductor 40. The flow of current in the winding 60 of generator 56 energizes the generator 56 whereby current of the same polarity as the current which normally flows through the field winding 20 connected to the conductors 40 and 42 is additionally supplied to the field winding 20 of motor 12 effecting a boosting or increase in the energization of the winding 20.

Simultaneously with the increase in the energization of the winding 20, the energization of the winding 94 of the electromagnetic device 90 is changed to damp the initial movement of the driving member 130 against the conducting members 80. The energization of the generator 56 increases the voltage drop across the armature windings 54 so that the flux induced in the secondary winding 136 of potential transformer 138 causes a flow of current in the winding 94 to oppose the normal flow of current therein, thereby effecting a resultant decrease in the energization of the winding 94 and permitting the spring 124 to effect a movement of the lever 110 about its pivotal mounting away from the conducting members 80. At substantially the same time the potential transformer functions to oppose the normal flow of current in the winding 94 of electromagnetic device 90, the current transformer 50 due to the increase in flow of current through the primary winding 48 induces a flux in the secondary winding 49 thereof which also opposes the normal flow of current in the winding 94. The combined effect of the potential transformer 138 and the current transformer 50 effectively functions to damp the movement of the electromagnetic device 90 initiated by a movement of the planetary gear wheel 38 of the differential device 32, and prevents the shunting of too many sections of the variable resistor 64 from circuit with the field winding 60 of generator 56, thereby preventing too great a change in the exciting current, and consequently an overregulation of the speed of the motor 12.

If for any reason the speed of the motor 12 decreases with respect to the speed of the constant speed reference machine 10, then the differential device 32 functions through the planetary gear wheel 38 to drive the electromagnetic device 90 towards the right, as viewed in Fig. 1, to actuate the conducting spring leaf members 80 of primary control device 78 to shunt progressive sections of the variable resistor 66, and thereby effect a flow of current in the winding 60 of generator 56 of opposite polarity than that effected by an operation of the primary control device 76 to shunt the sections of resistor 64. With all of the sections of the variable resistor 64 in circuit in the bridge 62 and with sections of the variable resistor 66 shunted, current flows from the conductor 42, through the manually operated switch 74, the first conductor 88, the closed contact members 84 of primary control device 78, the last conductor 88 of the closed conductor springs 80, the sections of the resistor leg 66 which are not shunted, resistor 66, conductor 68, field winding 60 of the generator 56, conductor 70, resistor 65 of the bridge 62 and the variable resistor 72 to conductor 40. The flow of current through the winding 60 being of opposite polarity effects a bucking operation of the generator 56 to oppose the normal flow of current from conductor 42, through the field winding 20 of motor 12 to the conductor 40, thereby decreasing the energization of the field winding 20, and consequently increasing the speed of the motor 12.

Simultaneously with the decrease in the energization of the field winding 20, the potential transformer 138 and the current transformer 50 function to induce a current in the energizing winding 94 which will boost the normal current flow from conductor 42 through the winding 94 to conductor 40. The slight increase in the energization of the winding 94 increases the magnetic pull on the armature 96 to actuate the lever arm 110 about its pivotal mounting in a direction opposing the initial movement of the electromagnetic device 90 in response to movement of the planetary gear wheel 38 of the differential connection 32. This movement of the lever arm 110 about its pivotal mounting in opposition to the actuating movement of the electromagnetic device 90 prevents the initiating movement of the electromagnetic device 90 from overregulating the flow of current in the winding 60 of the generator 56 and consequently from overregulating the energization of the field winding 20 of motor 12. It is, of course, to be understood that the current flow in the winding 94 of the electromagnetic device 90 caused by the change in the energization of the generator 56, through the damping transformers 138 and 50 is a small change and dies out as the current flow through the primary winding 48 of current transformer 50 and the voltage across the armature windings 54 of the generator 56 become substantially constant.

By providing the spring pivotal mounting for the lever 110, it is quite evident that the small change in the current flowing in the magnetic winding 94 due to a change in the energization of the generator 56 effects a slight movement of the lever 110 about its pivotal mounting. However, since the pivot spring members are relatively stiff, the movement of the planetary gear wheel 38 of the differential device 32 is effectively transmitted through the pivotal mounting to effect a direct movement of the lever 110, and consequently the driving members carried thereby to directly operate the primary control device 76 or 78.

Whether the change in the energization of the field winding 20 of motor 12 is an increase or a decrease, after the regulating action has been initiated and the desired increase or decrease in the energization is obtained, the generator 56 functions to permit the delivery of a substantially constant current from line conductor 42, through the field winding 20 to the conductor 40. Under these conditions, the differential connection 32 and the electromagnetic device 90 carried thereby is stationary, no change in the energization of the winding 94 of the electromagnetic device 90 being encountered.

The regulator of this invention gives a direct, quick, accurate regulation while at the same time providing damping for preventing overregulation of the exciting current. The apparatus employed is of standard design and can readily be assembled in the simplified arrangement of parts illustrated and described for obtaining the quick accurate control.

Although this invention has been described with reference to a particular embodiment thereof, it is, of course, not to be limited thereto except insofar as is necessitated by the scope of the appended claims.

I claim as my invention:

1. In a regulator, in combination, a constant speed reference machine, a dynamo-electric machine provided with a field winding to be regulated, a differential connection disposed between the constant speed reference machine and the dynamo-electric machine, the differential connection being responsive to changes in speed between the reference machine and the dynamo-electric machine, means for exciting the field winding of the dynamo-electric machine, means for controlling the current delivered by the exciting means, an electromagnetic means comprising a core member, an energizing winding carried by the core member and an armature pivotally carried by the core member, the electromagnetic means being carried by the differential and being so disposed that when it is moved by the differential it actuates the means for controlling the exciting current, the energizing winding of the electromagnetic means being responsive to a function of the exciting current for operating the control means for the exciting current thereby effecting a damping of the operation initiated by the movement of the differential.

2. In a regulator, in combination, a constant speed reference machine, a dynamo electric machine provided with a field winding to be regulated, a differential connection disposed between the constant speed reference machine and the dynamo-electric machine, the differential connection being responsive to changes in speed between the constant speed reference machine and the dynamo-electric machine, means for exciting the field winding of the dynamo-electric machine, a plurality of contact members disposed to be actuated into engagement in sequence for controlling the current delivered by the exciting means, an electromagnetic means comprising a core member, an energizing winding carried by the core member, an armature pivotally carried by the core member, and a driving member carried by the armature, the driving member being disposed for movement as the armature moves to actuate the contact members, the electromagnetic means being carried by the differential, the electromagnetic means being so disposed that when it is moved by the differential the driving member actuates the contact members for controlling the exciting current, the energizing winding of the electromagnetic means being responsive to a function of the exciting current for actuating the driving member in opposition to the movement of the electromagnetic means initiated through a movement of the differential to damp the initial controlling operation.

3. In a regulator, in combination, a constant speed reference machine, a dynamo-electric machine provided with a field winding to be regulated, a differential connection disposed between the constant speed reference machine and the dynamo-electric machine, the differential connection being responsive to changes in speed between the reference machine and the dynamo-electric machine, means for exciting the field winding of the dynamo-electric machine, means for controlling the current delivered by the exciting means, an electromagnetic means comprising a core member, an energizing winding carried by the core member and an armature pivotally mounted on the core member, the pivotal mounting for the armature permitting a slight movement of the armature but being relatively stiff to resist a large movement of the armature, the electromagnetic means being carried by the differential, the electromagnetic means being so disposed that when it is moved by the differential it actuates the means for controlling the exciting current, the energizing winding of the electromagnetic means being responsive to a function of the exciting current for effecting a slight movement of the armature about its pivotal mounting for operating the control means for the exciting current whereby the operation initiated through a movement of the differential is damped by the electromagnetic means.

4. In a regulator, in combination, a constant speed reference machine, a dynamo-electric machine provided with a field winding to be regulated, a differential connection disposed between the constant speed reference machine and the dynamo-electric machine, the differential connection being responsive to changes in speed between the constant speed reference machine and the dynamo-electric machine, means for exciting the field winding of the dynamo-electric machine, a plurality of contact members disposed to be actuated into engagement in sequence for controlling the current delivered by the exciting means, an electromagnetic means comprising a core member, an energizing winding carried by the core member, an armature pivotally mounted on the core member, and a driving member carried by the armature, the pivotal mounting for the armature being relatively weak to permit a slight movement of the armature and relatively stiff to resist a large movement of the armature, the driving member being disposed for movement as the armature moves to actuate the contact members, the electromagnetic means being carried by the differential, the electromagnetic means being so disposed that when it is moved by the differential the movement is transmitted by the relatively stiff pivotal mounting to the driving member to actuate the contact members for controlling the exciting current, the energizing winding of the electromagnetic means being responsive to a function of the exciting current for effecting a slight movement of the armature about its pivotal mounting to actuate the driving member in opposition to the movement of the electromagnetic means initiated through a movement of the differential to damp the initial controlling operation.

5. In a regulator, in combination, a constant speed reference machine, a dynamo-electric machine provided with a field winding to be regulated, a differential connection disposed between the constant speed reference machine and the dynamo-electric machine, the differential connection being responsive to changes in speed between the constant speed reference machine and the dynamo-electric machine, a generator provided with a field winding for exciting the field winding of the dynamo-electric machine, a resistance bridge having two variable resistor legs connected in circuit with the field winding of the generator, a primary control device comprising a plurality of contact members disposed to be actuated in sequence associated with each of the variable resistor legs for adjusting the resistance of the bridge and control the excitation of the generator thereby controlling the excitation of the dynamo-electric machine, electromagnetic means carried by the differential, the electromagnetic means comprising a core member, an energizing winding carried by the core member and an armature pivotally carried by the core member, the electromagnetic means being disposed for movement when the differential is moved to actuate the contact members in sequence, the energizing winding of the electromagnetic means being responsive to a change in the excitation of the field winding of the dynamo-electric machine to effect a damping of the operation initiated by the movement of the differential.

RALPH A. GEISELMAN.